US011586418B2

(12) United States Patent
Tseng et al.

(10) Patent No.: US 11,586,418 B2
(45) Date of Patent: Feb. 21, 2023

(54) RANDOM NUMBER GENERATOR, RANDOM NUMBER GENERATING CIRCUIT, AND RANDOM NUMBER GENERATING METHOD

(71) Applicant: MACRONIX INTERNATIONAL CO., LTD., Hsinchu (TW)

(72) Inventors: Po-Hao Tseng, Taichung (TW); Ming-Hsiu Lee, Hsinchu (TW); Yu-Hsuan Lin, Taichung (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 400 days.

(21) Appl. No.: 16/807,194

(22) Filed: Mar. 3, 2020

(65) Prior Publication Data
US 2021/0224041 A1 Jul. 22, 2021

Related U.S. Application Data

(60) Provisional application No. 62/962,198, filed on Jan. 17, 2020.

(51) Int. Cl.
G06F 7/58 (2006.01)
G06F 9/30 (2018.01)
G06F 1/14 (2006.01)
G06F 1/10 (2006.01)

(52) U.S. Cl.
CPC .............. *G06F 7/58* (2013.01); *G06F 1/10* (2013.01); *G06F 1/14* (2013.01); *G06F 7/584* (2013.01); *G06F 9/30032* (2013.01); *G06F 9/30134* (2013.01)

(58) Field of Classification Search
CPC .................................. G06F 7/58; G06F 7/582
See application file for complete search history.

(56) References Cited

U.S. PATENT DOCUMENTS

| 5,175,494 A | 12/1992 | Yoshimori |
| 5,251,165 A * | 10/1993 | James, III ............... G06F 7/582 |
| | | 708/250 |
| 5,383,143 A | 1/1995 | Crouch et al. |

(Continued)

FOREIGN PATENT DOCUMENTS

| CN | 109039533 A | 12/2018 |
| TW | I327855 B | 7/2010 |
| TW | I579763 B | 4/2017 |

OTHER PUBLICATIONS

TW Office Action dated May 6, 2021 in Taiwan application (No. 109106829).

*Primary Examiner* — Sophia Vlahos
(74) *Attorney, Agent, or Firm* — McClure, Qualey & Rodack, LLP

(57) ABSTRACT

A random number generator, a random number generating circuit, and a random number generating method are provided. The random number generating circuit includes the random number generator and executes the random number generating method. The random number generator includes a shift register having N storage elements and a combinational logic circuit. The N storage elements receive a random seed in a static state and repetitively perform a bit shift operation in a plurality of clock cycles. The combinational logic circuit generates an output sequence based on the random seed and a random bitstream received from an external source.

16 Claims, 11 Drawing Sheets

(56) References Cited

U.S. PATENT DOCUMENTS

| | | | | |
|---|---|---|---|---|
| 5,432,853 | A * | 7/1995 | Yamamoto | H04L 9/0662 |
| | | | | 708/250 |
| 6,323,788 | B1 * | 11/2001 | Kim | H03M 13/2764 |
| | | | | 714/701 |
| 6,807,553 | B2 * | 10/2004 | Oerlemans | G06F 7/588 |
| | | | | 708/251 |
| 7,516,169 | B2 * | 4/2009 | Collier | G06F 7/582 |
| | | | | 708/251 |
| 8,019,802 | B2 | 9/2011 | Rose et al. | |
| 8,595,277 | B2 * | 11/2013 | Goettfert | G06F 7/588 |
| | | | | 708/250 |
| 8,861,725 | B2 | 10/2014 | Goettfert et al. | |
| 9,141,338 | B2 | 9/2015 | Idgunji et al. | |
| 11,281,431 | B2 * | 3/2022 | Tamiya | H03K 19/21 |
| 2002/0129071 | A1 | 9/2002 | Howlett | |
| 2004/0039762 | A1 * | 2/2004 | Hars | G06F 7/588 |
| | | | | 708/255 |
| 2006/0104443 | A1 * | 5/2006 | Chari | H04L 9/0662 |
| | | | | 380/46 |
| 2006/0123072 | A1 * | 6/2006 | Onaya | H04L 9/0662 |
| | | | | 708/250 |
| 2007/0150531 | A1 * | 6/2007 | Jeon | H04L 9/0662 |
| | | | | 708/250 |
| 2018/0375650 | A1 * | 12/2018 | Legre | G06F 1/12 |
| 2020/0241841 | A1 * | 7/2020 | Tamiya | H03K 19/21 |
| 2021/0191692 | A1 * | 6/2021 | Sasaki | G06F 7/06 |

\* cited by examiner random seed (41a) = "1000"     random seed (41b) = "1000"

| clk | Q | q4 | q3 | q2 | q1 |
|---|---|---|---|---|---|
| initial stage | - | 1 | 0 | 0 | 0 |
| 1 | 0 | 1 | 0 | 0 | 0 |
| 2 | 0 | 0 | 1 | 0 | 0 |
| 3 | 1 | 0 | 0 | 1 | 0 |
| 4 | 0 | 1 | 0 | 0 | 1 |
| 5 | 0 | 0 | 1 | 0 | 0 |
| 6 | 1 | 0 | 0 | 1 | 0 |
| 7 | 1 | 1 | 0 | 0 | 1 |
| 8 | 1 | 1 | 1 | 0 | 0 |
| 9 | 1 | 1 | 1 | 1 | 0 |
| 10 | 0 | 1 | 1 | 1 | 1 |
| 11 | 0 | 0 | 1 | 1 | 1 |
| 12 | 1 | 0 | 0 | 1 | 1 |
| 13 | 1 | 1 | 0 | 0 | 1 |
| 14 | 0 | 1 | 1 | 0 | 0 |
| 15 | 1 | 0 | 1 | 1 | 0 |
| 16 | 1 | 1 | 0 | 1 | 1 |
| 17 | 1 | 1 | 1 | 0 | 1 |
| 18 | 1 | 1 | 1 | 1 | 0 |
| 19 | 0 | 1 | 1 | 1 | 1 |
| 20 | 1 | 0 | 1 | 1 | 1 |
| 21 | 0 | 1 | 0 | 1 | 1 |
| 22 | 1 | 0 | 1 | 0 | 1 |
| 23 | 1 | 1 | 0 | 1 | 0 |
| 24 | 0 | 1 | 1 | 0 | 1 |
| 25 | 1 | 0 | 1 | 1 | 0 |
| 26 | 0 | 1 | 0 | 1 | 1 |
| 27 | 1 | 0 | 1 | 0 | 1 |
| 28 | 0 | 1 | 0 | 1 | 0 |
| 29 | 1 | 0 | 1 | 0 | 1 |
| 30 | 1 | 1 | 0 | 1 | 0 |
| 31 | 1 | 1 | 1 | 0 | 1 |
| 32 | 0 | 1 | 1 | 1 | 0 |
| 33 | 0 | 0 | 1 | 1 | 1 |
| 34 | 0 | 0 | 0 | 1 | 1 |
| ⋮ | ⋮ | ⋮ | ⋮ | ⋮ | ⋮ |

| clk | P | p4 | p3 | p2 | p1 |
|---|---|---|---|---|---|
| initial stage | - | 1 | 0 | 0 | 0 |
| 1 | 0 | 1 | 0 | 0 | 0 |
| 2 | 0 | 0 | 1 | 0 | 0 |
| 3 | 1 | 0 | 0 | 1 | 0 |
| 4 | 1 | 1 | 0 | 0 | 1 |
| 5 | 0 | 1 | 1 | 0 | 0 |
| 6 | 1 | 0 | 1 | 1 | 0 |
| 7 | 0 | 1 | 0 | 1 | 1 |
| 8 | 1 | 0 | 1 | 0 | 1 |
| 9 | 1 | 1 | 0 | 1 | 0 |
| 10 | 1 | 1 | 1 | 0 | 1 |
| 11 | 1 | 1 | 1 | 1 | 0 |
| 12 | 0 | 1 | 1 | 1 | 1 |
| 13 | 0 | 0 | 1 | 1 | 1 |
| 14 | 0 | 0 | 0 | 1 | 1 |
| 15 | 1 | 0 | 0 | 0 | 1 |
| 16 | 0 | 1 | 0 | 0 | 0 |
| 17 | 0 | 0 | 1 | 0 | 0 |
| 18 | 1 | 0 | 0 | 1 | 0 |
| 19 | 1 | 1 | 0 | 0 | 1 |
| 20 | 0 | 1 | 1 | 0 | 0 |
| 21 | 1 | 0 | 1 | 1 | 0 |
| 22 | 0 | 1 | 0 | 1 | 1 |
| 23 | 1 | 0 | 1 | 0 | 1 |
| 24 | 1 | 1 | 0 | 1 | 0 |
| 25 | 1 | 1 | 1 | 0 | 1 |
| 26 | 1 | 1 | 1 | 1 | 0 |
| 27 | 0 | 1 | 1 | 1 | 1 |
| 28 | 0 | 0 | 1 | 1 | 1 |
| 29 | 0 | 0 | 0 | 1 | 1 |
| 30 | 1 | 0 | 0 | 0 | 1 |
| 31 | 0 | 1 | 0 | 0 | 0 |
| 32 | 0 | 0 | 1 | 0 | 0 |
| 33 | 1 | 0 | 0 | 1 | 0 |
| 34 | 1 | 1 | 0 | 0 | 1 |
| ⋮ | ⋮ | ⋮ | ⋮ | ⋮ | ⋮ |

FIG. 8

RANDOM NUMBER GENERATOR, RANDOM NUMBER GENERATING CIRCUIT, AND RANDOM NUMBER GENERATING METHOD

This application claims the benefit of U.S. provisional application Ser. No. 62/962,198, filed Jan. 17, 2020, the subject matter of which is incorporated herein by reference.

TECHNICAL FIELD

The disclosure relates in general to a random number generator, a random number generating circuit, and a random number generating method capable of quickly generating an output sequence with high randomness.

BACKGROUND

Random numbers are useful for a variety of purposes. For example, the random number is used in generating a one-time password (OTP) to prevent from being attacked. The randomness is very important because otherwise, it would be easy to predict future OTPs by observing previous ones. In addition, the random number sequence is widely used in cryptographic applications, which are essential for new communication technologies such as 5G and IoT. For the use of communication technologies, the speed of generating the random number sequence is concerned. As thus described, randomness and speed are the two important concerns while designing the random number generator.

SUMMARY

The disclosure is directed to a random number generator, a random number generating circuit, and a random number generating method capable of quickly generating an output sequence with high randomness.

According to one embodiment, a random number generator operating based on a plurality of clock cycles is provided. The random number generator includes a shift register, a combinational logic circuit, and a feedback terminal. The shift register includes N storage elements, which are electrically connected in series. The N storage elements are configured to respectively receive N bits of a random seed in a static state, and the shift register is configured to repetitively perform a bit shift operation in the plurality of clock cycles. The combinational logic circuit includes a first input terminal, a second input terminal, and at least one logic gate. The first input terminal is electrically connected to an external source, from which a random bitstream is able to be continually received in the plurality of clock cycles. The second input terminal is electrically connected to the first storage element. The second input terminal taps datum stored at the first storage element. The at least one logic gate performs at least one logic operation based on the random bitstream and the datum tapped by the second input terminal. The feedback terminal is electrically connected to the second storage element. The feedback terminal outputs an output sequence in the plurality of clock cycles in response to the at least one logic operation. Datum stored at the second storage element is configured to be repetitively updated with the output sequence in the plurality of clock cycles.

According to another embodiment, a random number generating circuit is provided. The random number generating circuit includes a first random number generator. The first random number generator includes a first shift register, a first combinational logic, and a first feedback terminal. The first shift register includes N first storage elements, which are electrically connected in series. The N first storage elements include a first storage element of the first shift register, and a second storage element of the first shift register. The N first storage elements are configured to respectively receive N bits of a first random seed in a static state, and the first shift register is configured to repetitively perform a first bit shift operation in a plurality of clock cycles. The first combinational logic circuit includes a first input terminal, a second input terminal, and at least one first logic gate. The first input terminal of the first combinational logic circuit receives a first random bitstream from a first external source in a plurality of clock cycles. The second input terminal of the first combinational logic circuit, being electrically connected to the first storage element of the first shift register, taps datum stored at the first storage element of the first shift register. The at least one first logic gate performs at least one first logic operation based on the first random bitstream and the datum tapped by the second input terminal of the first combinational logic circuit. The first feedback terminal is electrically connected to the second storage element of the first shift register. The first feedback terminal outputs an output sequence in the plurality of clock cycles in response to the at least one first logic operation. Datum stored at the second storage element of the first shift register is configured to be updated with the output sequence in the plurality of clock cycles.

According to an alternative embodiment, a random number generating method applied to a random number generating circuit is provided. The random number generating circuit includes a shift register and a combinational logic circuit, and the random number generating method includes following steps. Firstly, a random seed with N bits is received in a static state. Then, a bit shift operation is repetitively performed, by the shift register, based on the random seed and a random bitstream. The combinational logic circuit repetitively receives the random bitstream in a plurality of clock cycles. Moreover, at least one logic operation is performed to the random bitstream and datum stored at a first storage element of the shift register. Furthermore, an output sequence is outputted in the plurality of clock cycles in response to the at least one logic operation, and datum stored at a second storage element of the shift register is updated with the output sequence.

BRIEF DESCRIPTION OF THE DRAWINGS

FIG. 8 is a schematic diagram illustrating the truth table of the output signals of the random number generators shown in FIG. 7.

Figure 1:
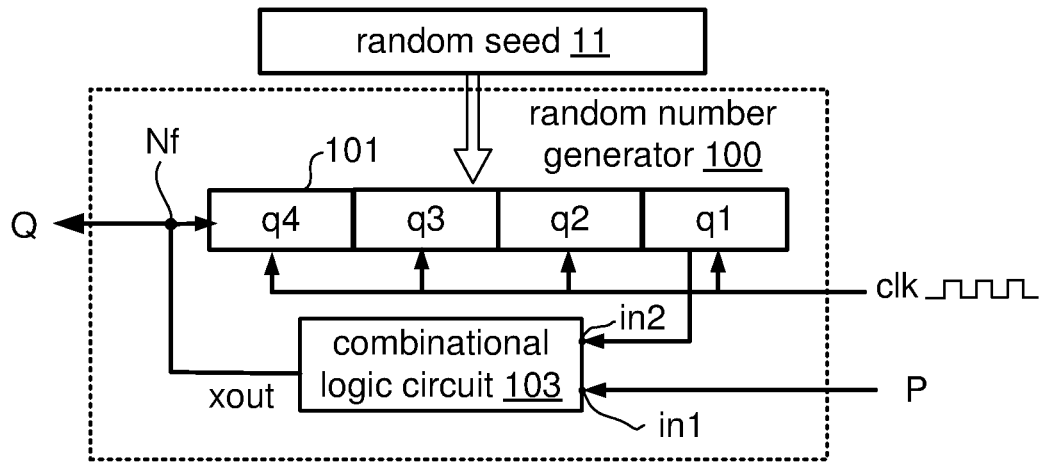
FIG. 1 is a schematic block diagram of a random number generator according to the embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In the specification, different embodiments of the random number generating circuit are shown. These exemplary random number generating circuits can generate output sequences Q with a high degree of randomness with high speed.

The high degree of randomness is assured because two random sources are utilized. The two random sources include a random seed received from an entropy source, and a random bitstream originated from an external source. The design of the random number generator(s) in the random number generating circuit is hardware-based, so the generation speed of the output sequences Q is guaranteed. With the introduction of the random bitstream, the output sequences Q becomes unpredictable even if the hardware design of the random number generating circuit is hacked by reverse engineering. The embodiments of the random number generating circuit are illustrated below.

FIG. 1 is a schematic block diagram of a random number generator according to the embodiment of the present disclosure. The random number generator 100 includes a linear feedback shift register (LFSR) 101, a combinational logic circuit 103, and a feedback terminal Nf.

The LFSR 101 has M storage elements, wherein the M storage elements are electrically connected in series, and M is a positive integer. Being electrically connected in series, the storage elements can be, for example, D flip-flops. In FIG. 1, it is assumed M is equivalent to "4". The LFSR 101 receives a random seed 11 from an entropy source. The entropy source can be, for example, a bitmap table with physical unclonable function (PUF), a random telegraph noise (RTN) source, an unstable electronic oscillator, a real-time clock (RTC), a software-based seed, or an algorithm-based seed.

The storage elements q1~q4 in LFSR 101 operates in response to a clock signal clk. Each of the storage elements q1~q4 represents a bit of "0" or "1". The cycle of the clock signal is defined as a clock cycle, and the storage elements q1, q2, q3, q4 perform bit shift operation on a clock-by-clock basis.

The combinational logic circuit 103 includes two input terminals in1, in2. The input terminal in1 receives a random bitstream P from an external source, which can be the same or different from the entropy source. The random bitstream P can be provided by an external source such as an unstable flip-flop, a random telegraph noise (RTN) device, a real-time clock (RTC), an unstable electronic oscillator and so forth. Alternatively, the random bitstream P can be originated from another random number generator.

The input terminal in2 taps datum stored at one of the storage elements q1, q2, q3, q4 (for example, the storage element q1). The output of the combinational logic circuit 103 (xout) is generated by performing the logical operation to the input terminals in1, in2. The exact logic operation is determined by the logic gate(s) in the combinational logic circuit 103.

The feedback terminal Nf is electrically connected to the storage element q4 and the output of the combinational logic circuit 103. In addition, the feedback terminal Nf serves as an output of the random number generator 100. A logic level of the feedback terminal Nf is updated in every clock cycle of the clock signal clk. The logic level of the feedback terminal Nf is utilized as an output sequence Q. The logic level refers to binary logic in which two levels (logic "1" and logic "0") can exist. According to the embodiment of the present disclosure, the output sequence Q has not only high randomness but also unpredictable feature.

Figure 2A:
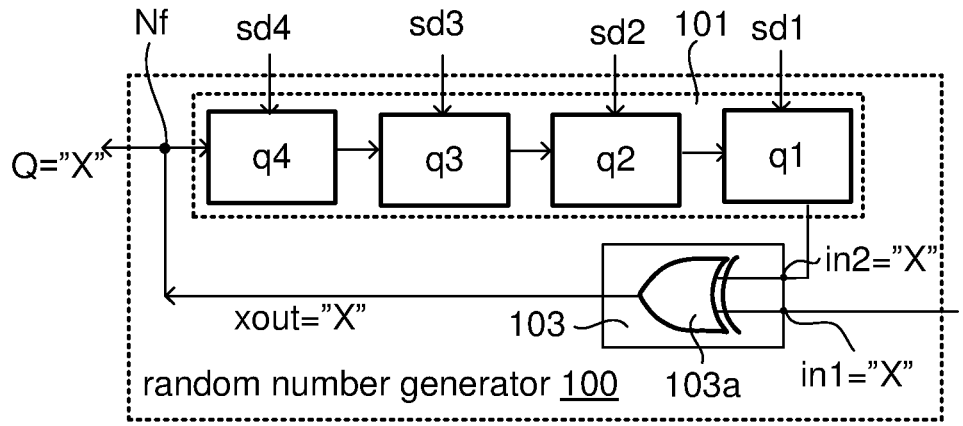
FIGS. 2A-2C are schematic diagrams illustrating the operation of the random number generator shown in FIG. 1.
Figure 2B:
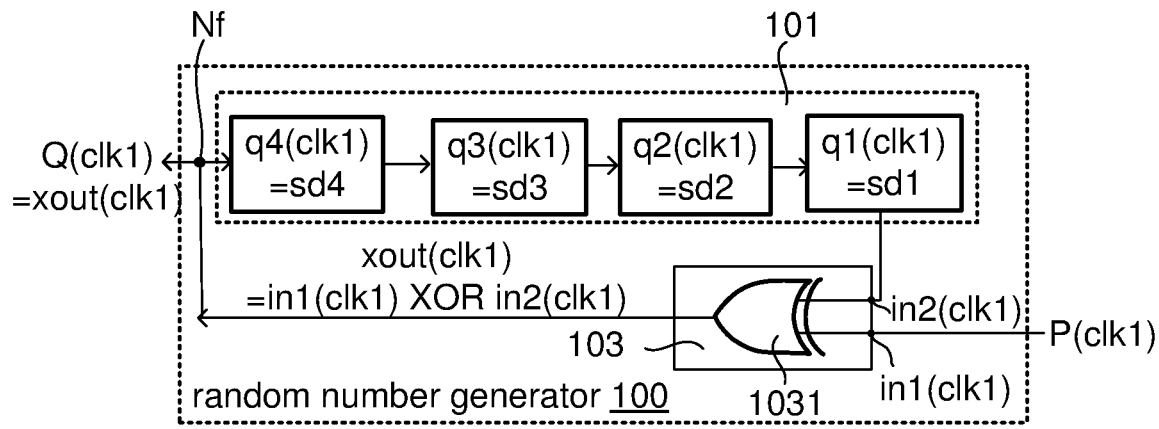
Figure 2C:
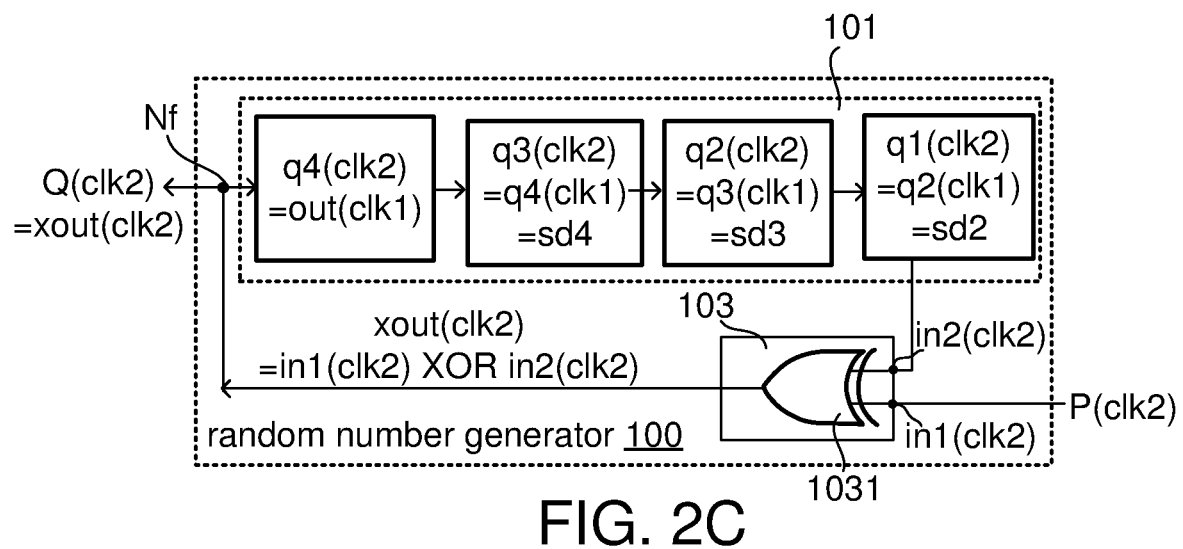

According to the embodiment of the present disclosure, the LFSR 101 receives the random seed 11 upon power-on or reset of the random number generator 100. Besides, the LFSR 101 stops receiving the random seed 11 while performing the bit shift operation. In FIGS. 2A, 2B, and 2C, the combinational logic circuit 103 is assumed to include only one logic gate (for example, an exclusive-or (XOR) gate). However, the implementation of the combinational logic circuit 103 is not limited.

FIGS. 2A-2C are schematic diagrams illustrating the operation of the random number generator shown in FIG. 1. For the sake of illustration, the clock signal clk is not drawn in some figures. FIG. 2A is corresponding to a static state when the LFSR 101 receives the random seed 11, FIGS. 2B and 2C are corresponding to the operation of the random number generator 100 when a bit shift operation is performed by the LFSR 101. FIGS. 2B and 2C respectively represent the random number generator 10 during a clock cycle clk1 and a clock cycle clk2. The clock cycle clk1 represents the first clock cycle after the static state, and the clock cycle clk2 represents the clock cycle next to (immediately after) the clock cycle clk1.

FIG. 2A is now illustrated. In the static state, the storage element q1 receives and stores the last bit (sd1) of the random seed 11, the storage element q2 receives and stores the second-last bit (sd2) of the random seed 11, the storage element q3 receives and stores the second-foremost bit (sd3) of the random seed 11, and the storage element q4 receives and stores the first-foremost bit (sd4) of the random seed 11. In the initial state, input terminals in1, in2 of the combinational logic circuit 103, have not received any signal. Therefore, the feedback terminal Nf is "unknown" in the static state.

FIG. 2B is now illustrated. Before the clock cycle clk1 starts, the storage element q1~q4 have respectively stored the last bit (sd1), the second-last bit (sd2), the second-foremost bit (sd3), and the first-foremost bit (sd4) of the random seed 11.

Meanwhile, the input terminal in1 of the combinational logic circuit 103 receives a bit of the random bitstream received at the clock cycle clk1 P(clk1), and the input terminal in2 of the combinational logic circuit 103 taps datum stored the storage element q1, that is, the last bit (sd1) of the random seed 11. As the logic inputs of the logic gate 1031 are respectively electrically connected to the input terminals in1, in2 of the combinational logic circuit 103, the logic gate 1031 performs XOR operation to the random bitstream received in the clock cycle clk1 P(clk1) and the datum tapped by the input terminal in2 in the clock cycle clk1, that is, the last bit (sd1) of the random seed 11. Therefore, the feedback terminal Nf in the clock cycle clk1 is equivalent to an XOR result of the random bitstream received at the clock cycle clk1 P(clk1) and the last bit (sd1) of the random seed 11.

FIG. 2C is now illustrated. During the clock cycle clk2 in FIG. 2C, a bit shift operation is performed by the LFSR 101. The bit shift operation of the storage element q1 is briefly illustrated here as an example. The bit shift operations related to the storage elements q2, q3, q4 are not redundantly illustrated.

The datum stored at the storage element q2 during the clock cycle clk1 q2(clk1)=sd2 is transmitted to the storage element q1 during the clock cycle clk2 q1(clk2). Therefore, in FIG. 2C, the datum stored at the storage element q1 during the clock cycle clk2 is equivalent to the second-last bit (sd2) of the random seed 11. That is, q1(clk2)=q2(clk1)=sd2.

As shown in FIG. 2C, the input terminal in1 of the combinational logic circuit 103 receives a bit of the random bitstream P received at the clock cycle clk2 P(clk2), and the input terminal in2 of the combinational logic circuit 103 taps datum stored at the storage element q1, that is, the second-last bit (sd2) of the random seed 11. Similar to the descriptions in FIG. 2B, the output sequence Q generated at the clock cycle clk2 Q(clk2) is equivalent to the XOR result of the random bitstream P received at the clock cycle clk2 P(clk2) and the second-last bit of the random seed (sd2).

Figure 3:
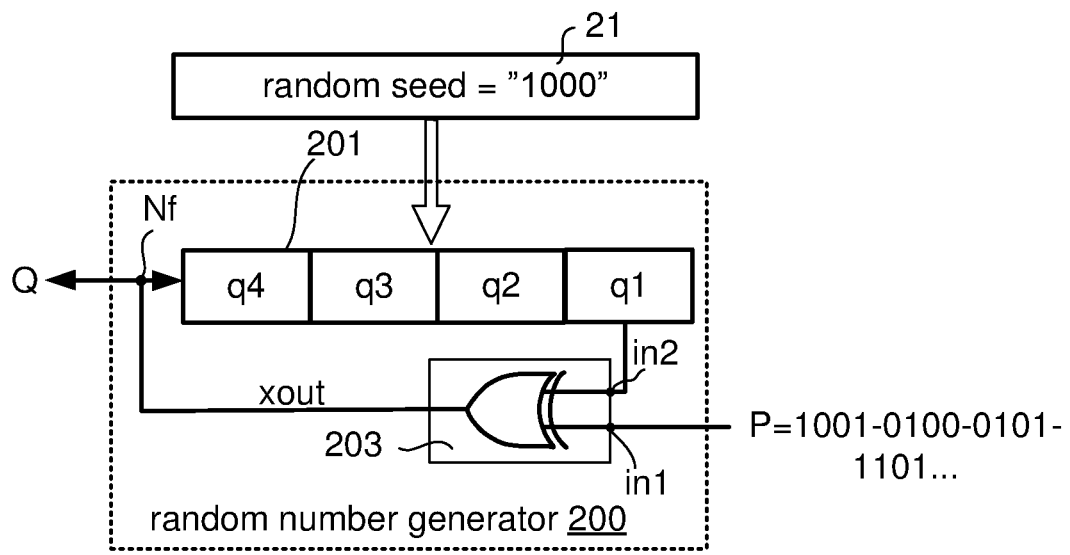
FIG. 3 is a schematic diagram illustrating a random sequence input is received by the random number generator.

FIG. 3 is a schematic diagram illustrating a random sequence input is received by the random number generator 200. The random number generator 200 includes an LFSR 201 having storage elements q1~q4, a combinational logic circuit 203, and a feedback terminal Nf. The LFSR 201 is initialized with the random seed 21 ("1000"). As the LFSR 201 operates in response to the clock cycles, a waveform showing changes of the signals related to the operation of the random number generator 200 is shown in FIG. 4.

Figure 4:
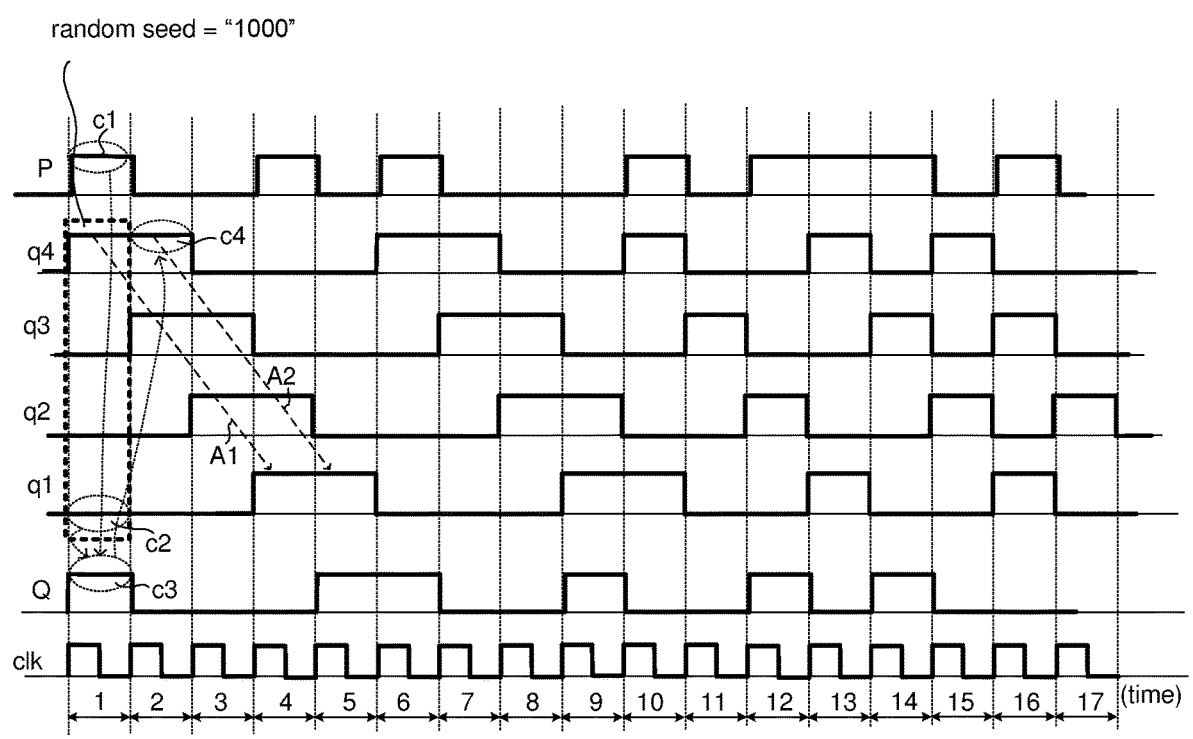
FIG. 4 is a schematic waveform diagram illustrating the operation of the random number generator shown in FIG. 3.

FIG. 4 is a schematic waveform diagram illustrating the operation of the random number generator shown in FIG. 3. From top to down, the vertical axis represents the random bitstream P, the datum stored at the storage element q4, the datum stored at the storage element q3, the datum stored at the storage element q2, the datum stored at the storage element q1, the output sequence Q, and the clock signal clk, respectively. The horizontal axis represents time, and multiple clock cycles clk=1~17 are shown.

The dotted rectangle shows that the random seed being stored to the storage elements q1, q2, q3, q4 is "1000". The dotted arrows A1, A2 represent the bit shift operation performed by the LFSR 201.

The signals related to the dotted arrow A1 are illustrated. The datum stored at the storage element q4 in the clock cycle clk=1 is a logic high level "1". Then, the datum stored at the storage element q4 in the clock cycle clk=1 (logic high level "1") is further shifted to the storage element q3 in the clock cycle clk=2. Therefore, the datum stored at the storage element q3 in the clock cycle clk=2 is a logic high level "1". Then, the datum stored at the storage element q3 in the clock cycle clk=2 (logic high level "1") is further shifted to the storage element q2 in the clock cycle clk=3. Therefore, the datum stored at the storage element q2 in the clock cycle clk=3 is a logic high level "1". Similarly, the datum stored at the storage element q2 in the clock cycle clk=3 (logic high level "1") is further shifted to the storage element q1 in the clock cycle clk=4. Therefore, the datum stored at the storage element q1 in the dock cycle clk=4 is a logic high level "1".

The signals related to the dotted arrow A2 are illustrated. During the clock cycle clk=2, the datum stored at the storage element q4 is updated with the output sequence Q generated in the clock cycle clk=1. Moreover, during the clock cycle clk=3, the datum stored at the storage element q3 is updated with the datum stored at the storage element q4 in the clock cycle clk=2. During the clock cycle clk=4, the datum stored at the storage element q2 is updated with the datum stored at the storage element q3 in the clock cycle clk=3. Similarly, during the clock cycle clk=5, the datum stored at the storage element q1 is updated with the datum stored at the storage element q2 in the clock cycle clk=4.

The dotted circles c1, c2, c3 collectively show the operation of the combinational logic circuit 203 in the clock cycle clk=1. The dotted circle c1 is corresponding to the random bitstream P in the clock cycle clk=1, that is, a logic high level "1". The dotted circle c2 is corresponding to the datum stored at the storage element q1 in the clock cycle clk=1, that is, a logic low level "0".

The dotted circle c3 is corresponding to the output sequence Q generated in the clock cycle clk=1, that is, a logic high level "1". The output sequence Q generated in the clock cycle clk=1 is the output of the combinational logic circuit 203. As shown in FIG. 3, the combinational logic circuit 203 receives the random bitstream P (P=1 in clk=1) and the datum stored at the storage element q1 (q1=0 in clk=1) through input terminals in1, in2. The random bitstream P and the datum stored at the storage element q1 are thus transmitted to the logic inputs of the logic gate in the combinational logic circuit 203. Then, by performing the XOR operation to the random bitstream P and the datum stored at the storage element q1 in the clock cycle clk=1, the output sequence Q generated in the clock cycle clk=1 is equivalent to a logic high level "1". Then, the dotted circle c4 shows that the output of the combinational logic circuit 203 is further transmitted to the storage element q4 and stored in the storage element q4 during the clock cycle clk=2.

The waveforms of the random bitstream P, the data stored at the storage elements q1~q4, and the output sequence Q have similar relationships as the ones of the clock cycle clk=1. To summarize the data sequence shown in FIG. 4, when the random seed "1100" is received in the static state and the random bitstream P "1001-0100-0101-1101" is received, the output sequence Q generated by the random number generator 200 is "1000-1100-1001-0100".

Please note that, as the output sequence Q is related to the random seed number and the random bitstream P, the output sequence Q is changed with the dynamically generated random bitstream P even if the random seed remains unchanged. For example, assuming that the random number generator 200 shown in FIG. 3 receives the same random seed "1000", but with another random bitstream P'="0011-0010-1110-0110 . . . ". Then, the output sequence Q' corresponding to the random bitstream P' will be "0001-1001-0010-100 . . . ."

Figure 5:
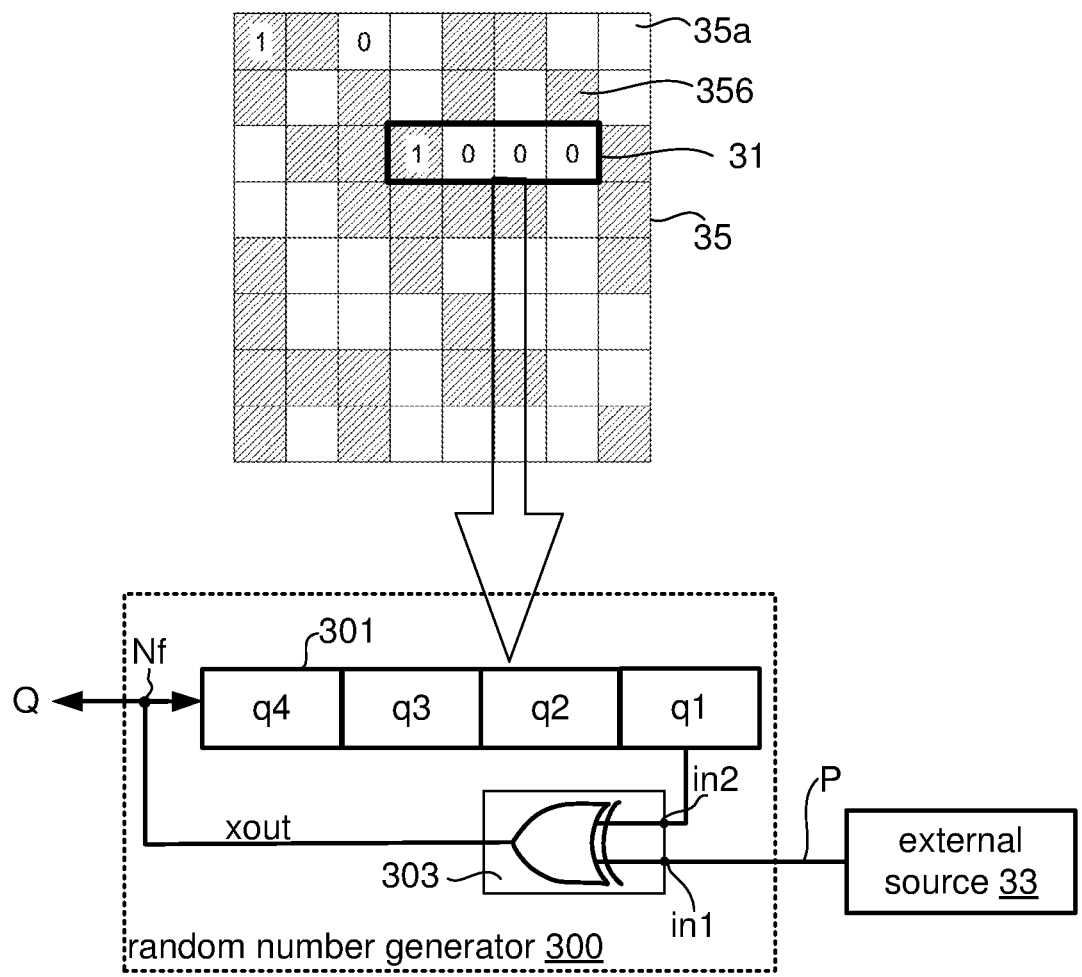
FIG. 5 is a schematic diagram illustrating the exemplary origin of the random seed and the random sequence input.

FIG. 5 is a schematic diagram illustrating the exemplary origin of the random seed and the random sequence input. The random seed 31 is provided by a bitmap 35 having a bitmap table with physical unclonable function (PUF), and the random bitstream P is received from an external source 33. In the bitmap 35, the white grids 35a are assumed to represent bits "0" and the grids 35b having diagonal shading are assumed to represent bits "1". The bitmap 35 serves as a non-deterministic entropy source, and the random bitstream P provided by the external source 33 is unpredictable. Therefore, the output sequence Q has true randomness.

In practical application, the logic gates being adapted in the combinational logic circuit, and the structures and/or connection of the logic gates are not limited. Examples of the combinational logic circuit having a two-stack structure are shown in FIGS. 6A and 6B.

Figure 6A:
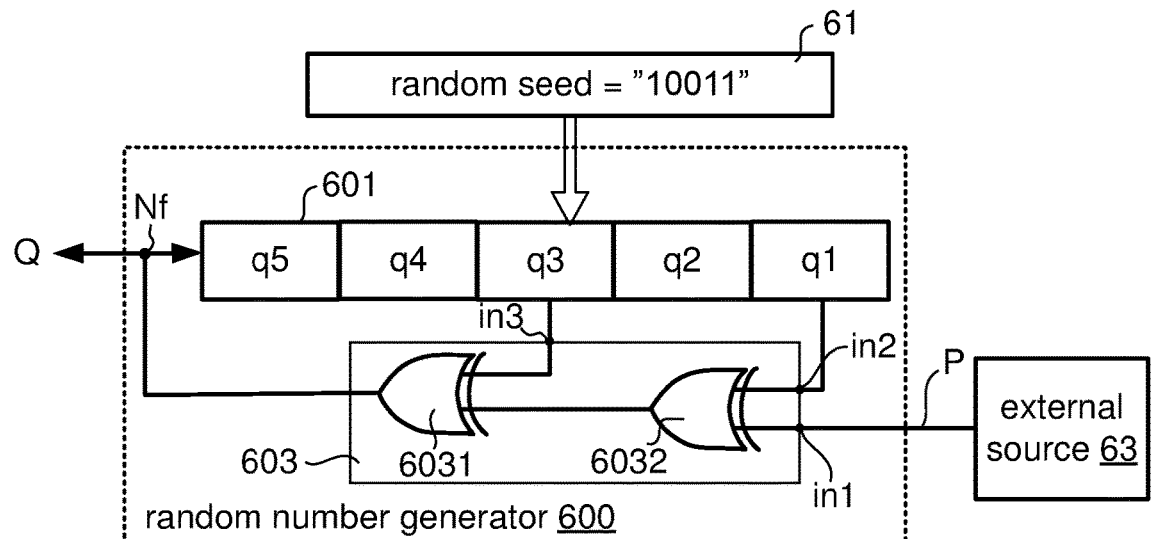
FIG. 6A is a schematic diagram illustrating an alternative implementation of the combinational logic circuit.
Figure 6B:
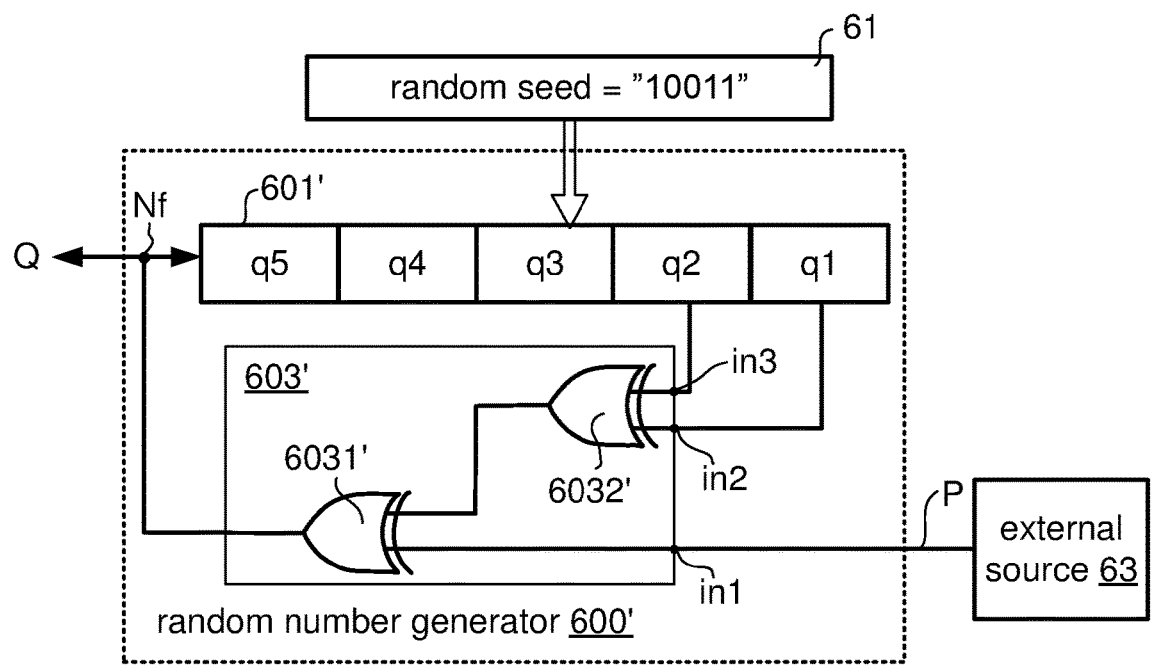
FIG. 6B is a schematic diagram illustrating another alternative implementation of the combinational logic circuit.

FIG. 6A is a schematic diagram illustrating an alternative implementation of the random number generator. In FIG. 6A, the random number generator 600 includes the LFSR 601 having 5 bits (M=5), a combinational logic circuit 603, and a feedback terminal Nf. The combinational logic circuit 603 receives the random bitstream P from an external source 63.

The combinational logic circuit 603 includes three input terminals in1, in2, in3, and two logic gates 6031, 6032. The logic gates 6031, 6032 are constructed in a two-stack manner. In FIG. 6A, the logic gates 6031, 6032 are assumed to be XORs, and each of them includes two logic inputs. The two logic inputs of the logic gate 6032 are respectively electrically connected to the input terminals in1, in2. The two logic inputs of the logic gate 6031 are respectively electrically connected to the output of the logic gate 6032 and the input terminal in3. Therefore, the logic gate 6032 can be defined as a first-stack logic gate, and the logic gate 6031 can be defined as a second-stack logic gate.

The input terminal in1 receives the random bitstream P, and the input terminal in2 taps datum stored at the storage element q1. Thus, logic inputs of the logic gate 6032 receive the random bitstream P and the datum stored at the storage element q1 through the input terminals in1, in2, respectively. The output of the logic gate 6032 is transmitted to one of the logic inputs of the logic gate 6031. Through the input terminal in3, the other of the logic input of the logic gate 6031 receives the datum stored at the storage element q3. Then, the logic gate 6031 generates the output sequence Q according to the output of the logic gate 6032 and the datum stored at the storage element q3. Details about the bit shift operation performed by the storage elements q1, q2, q3, q4 are omitted to avoid redundancy.

In FIG. 6A, as the first stack of logic gate, the logic gate 6032 receives the random bitstream P from the unstable oscillator. On the other hand, FIG. 6B shows another example that the logic gate at the second stack is utilized to receive the random bitstream P.

FIG. 6B is a schematic diagram illustrating another alternative implementation of the combinational logic circuit. In FIG. 6B, the random number generator 600' includes an LFSR 601' having 5 bits (M=5), a combinational logic circuit 603', and a feedback terminal Nf. The combinational logic circuit 603' receives the random bitstream P from the external source 63.

The combinational logic circuit 603' includes three input terminals in1, in2, in3, and two logic gates 6031', 6032'. The logic gates 6031', 6032' are constructed in a two-stack manner. In FIG. 6B, the logic gates 6031', 6032' are assumed to be XORs, and each of which includes two logic inputs. The logic inputs of the logic gate 6032' are respectively electrically connected to the input terminals in2, in3. The logic inputs of the logic gate 6031' are respectively electrically connected to the input terminal in1 and the output of the logic gate 6032'. Thus, the logic gate 6032' is defined as a first-stack logic gate, and the logic gate 6031' is defined as a second-stack logic gate.

The input terminal in1 receives the random bitstream P, the input terminal in2 taps datum stored at the storage element q1, and the input terminal in3 taps datum stored at the storage element q2. Thus, one of the logic inputs of the logic gate 6032' receives the datum stored at the storage element q1 through the input terminal in2, and the other logic input of the logic gate 6032' receives the datum stored at the storage element q2. The logic gate 6032' performs the logic operation and generates a first-stack XOR output. The output of the logic gate 6032' is transmitted to the logic gate 6031'. The logic inputs of the logic gate 6031' respectively receive the random bitstream P and the output of the logic gate 6032'. Then, the logic gate 6031' performs another logic operation and generates a second-stack XOR output, which is considered as the output sequence Q. Illustrations about the bit shift operation performed by the storage elements q1~q4 are omitted to avoid redundancy.

Figure 7:
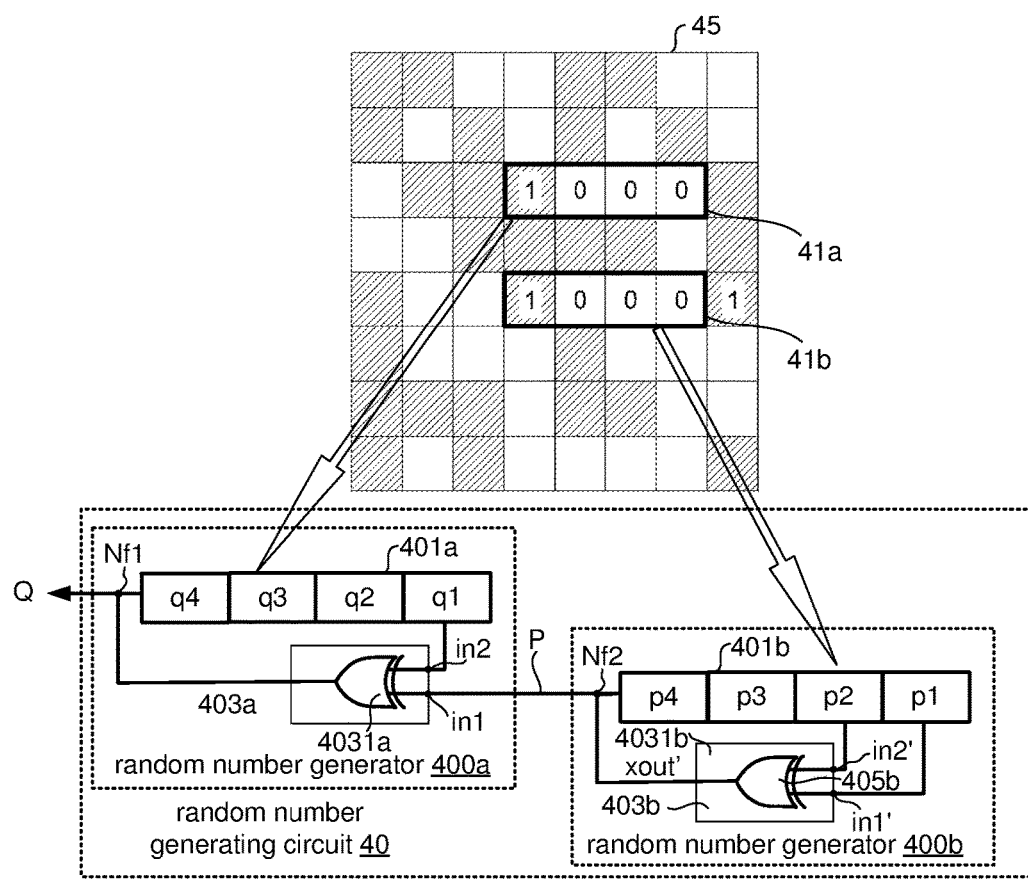
FIG. 7 is a schematic diagram illustrating a random number generating circuit having two stages of random number generator.

In some applications, the random number generating circuit may include plural random number generators. FIG. 7 is a schematic diagram illustrating a random number generating circuit having two stages of random number generator. The random number generating circuit 40 includes random number generators 400a, 400b. The random number generator 400b is defined as a first-stage random number generator, and the random number generator 400a is defined as a second-stage random number generator.

The random number generator 400b includes an LFSR 401b having storage elements p1~p4, a combinational logic circuit 403b, and a feedback terminal Nf2. The combinational logic circuit 403b includes a logic gate 4031b having two logic inputs, and two input terminals in1', in2'. The logic inputs of the logic gate 4031b are respectively electrically connected to the input terminals in1', in2' of the combinational logic circuit 403b.

The random number generator 400a includes an LFSR 401a having storage elements q1~q4, a combinational logic circuit 403a, and a feedback terminal Nf1. The combinational logic circuit 403a includes a logic gate 4031a having two logic inputs, and two input terminals in1, in2. The logic inputs of the logic gate 4031a are respectively electrically connected to the input terminals in1, in2 of the combinational logic circuit 403a.

In the static state, the LFSR 401b of the random number generator 400b receives the random seed 41b ("1000"), and the LFSR 401a of the random number generator 400a receives the random seed 41a ("1000"). Both the LFSRs 401a, 401b repetitively perform bit shift operation while receiving clock cycles of the clock signal clk. The random seeds 41a, 41b are assumed to be originated from the same bitmap but different locations.

The operation of the random number generator 400b is illustrated. After the LFSR 401b receives the random seed 41b in the static state, the storage elements p1, p2, p3, p4 perform bit shift operation in response to the clock signal clk. The input terminal in1' of the combinational logic circuit 403b taps the datum stored at the storage element p1, and the input terminal in2' of the combinational logic circuit 403b taps the datum stored at the storage element p2. After the logic gate 4031b performs the logic operation, the combinational logic circuit 403b generates its output xout' (that is, the random bitstream P) at its feedback terminal Nf2.

The operation of the random number generator 400a is related to the random seed 41a received at the static state, the random bitstream P, the bit shift operation of the LFSR 401*a*, and the design of the combinational logic circuit 403*a*. The internal design, connections, and operation of the random number generator 400*a* are similar to that of the random number generator 300 in FIG. 5, except that the origin of the random bitstream P in FIG. 7 is provided by another random number generator 400*b*. Then, the random number generator 400*a* generates the output sequence Q at its feedback terminal Nf1.

In FIG. 7, the random seeds 41*a*, 41*b* are received from different locations in the same bitmap table 45. The bitmap table 45 is with a physical unclonable function (PUF). The values of the random seeds 41*a*, 41*b* can be the same or different. Alternatively, it is possible to select the random seeds for the LFSRs 401*a*, 401*b* from the same location of the same bitmap table. In other words, the random seeds of the random number generators can be arbitrarily selected from source(s) capable of providing random data. The sources of the random seeds may be, for example, an unstable flip-flop, random telegraph noise (RTN) devices, a real-time clock (RTC), an unstable electronic oscillator, and so forth.

FIG. 8 is a schematic diagram illustrating the truth table of the output signals of the random number generators shown in FIG. 7. The left side and the right side of FIG. 8 are respectively corresponding to the operations of the random number generators 400*a* and 400*b*. As shown in the dotted rectangles, the random seed 41*a* being provided to the LFSR 401*a* at the initial stage is "1000", and the random seed 41*b* being provided to the LFSR 401*b* at the initial stage is "1000". The dotted arrows represent the bit shift operations performed by the LFSRs 401*a*, 401*b*.

Based on the random seed 41*b* ("1000") and the bit shift operation of the LFSR 401*b*, the combinational logic circuit 403*b* generates the random bitstream P="0011-0101-1110-0010-0110-1011-1100-0100-11 . . . " in response to the clock cycles. Based on the random seed 41*a* ("1000"), the random bitstream P, and the bit shift operation of the LFSR 401*a*, the combinational logic circuit 403*a* generates the output sequence Q. The random bitstream P is equivalent to the datum stored at the storage element p4 in the next dock cycle. Therefore, the random bitstream P during the clock cycles clk=1~33 is equivalent to the datum stored at the storage element p4 during the dock cycles clk=2~34.

The output sequence Q generated in the clock cycle clk=1 is equivalent to a logic low level "0" (not shown). As illustrated in FIG. 4, the output sequence Q is equivalent to the datum stored at the storage element q4 in the next clock cycle. For example, the output sequence Q during the clock cycle K is equivalent to the datum stored at the storage element q4 during the clock cycle clk=K+1. Thus, in FIG. 8, the output sequence Q in dock cycles clk=1~33 is "0010-0111-1001-1011-1101-0110-1010-1110-0 . . . ", and the datum stored at the storage element q4 in clock cycles clk2~34 is the same.

The output sequence Q and the data stored at the storage elements q1, q2, q3, q4, p1, p2, p3, p4 are shown, with changes of the clock cycles clk=1~34. As it can be observed from FIG. 8, the output sequence Q in clock cycles clk1~34 does not have a fixed pattern. In other words, the output sequence Q has high randomness.

Figure 9A:
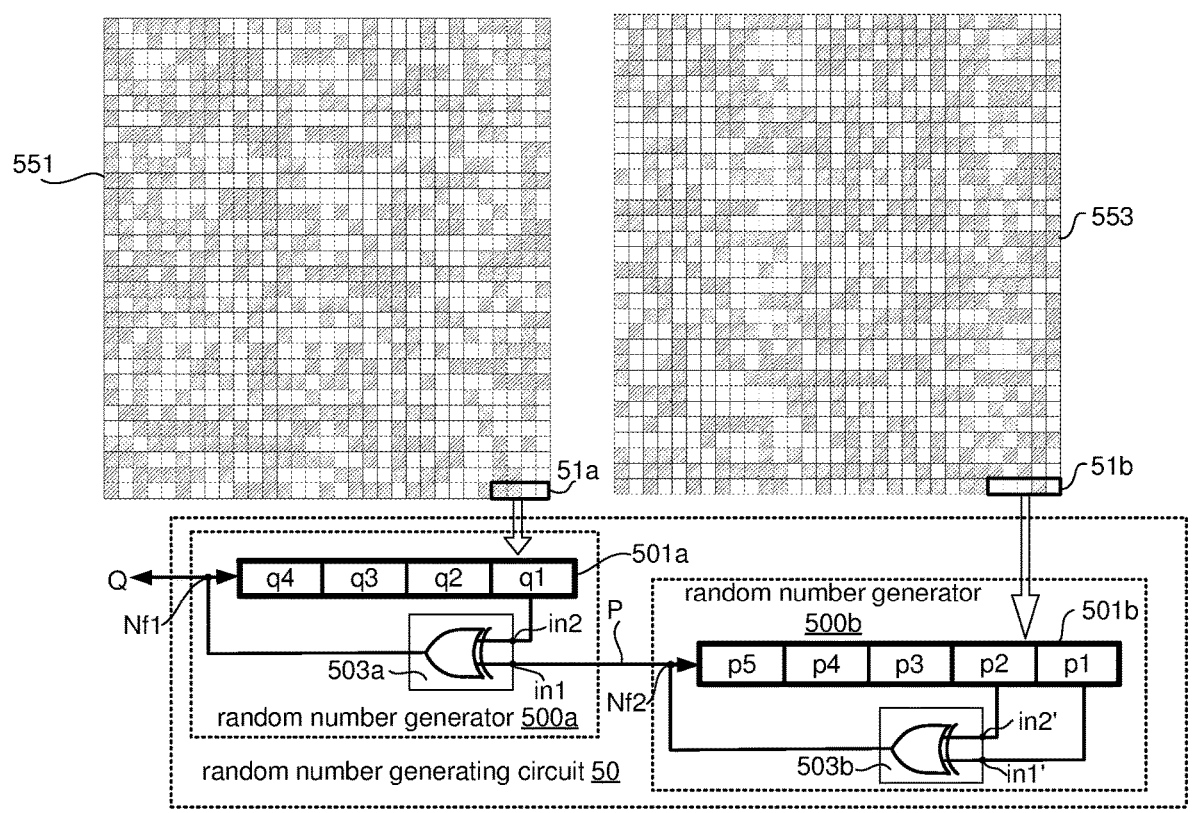
FIG. 9A is a schematic diagram illustrating the origins of random number seeds corresponding to the two random number generators in the same random number generating circuit.

FIG. 9A is a schematic diagram illustrating that the two random number generators in the same random number generating circuit utilize their random seeds from different origins. The random number generating circuit 50 includes random number generators 500*a*, 500*b*. The random number generator 500*b* includes an LFSR 501*b* having five storage elements p1~p5, a combinational logic circuit 503*b*, and a feedback terminal Nf2. The random number generator 500*a* includes an LFSR 501*a* having four storage elements q1~q4, a combinational logic circuit 503*a*, and a feedback terminal Nf1.

In the static state, the random number generator 500*b* receives the random seed 51*b* from the bitmap 553, and the random number generator 500*a* receives the random seed 51*a* from the bitmap 551. Both the LFSRs 501*a*, 501*b* repetitively perform bit shift operation while receiving clock cycles of the clock signal clk. The random number generator 500*b* is defined as a first-stage random number generator, and the random number generator 500*a* is defined as a second-stage random number generator.

The operation of the random number generator 500*b* is related to the random seed 51*b* received at the static state, the bit shift operation of the LFSR 501*b*, and the design of the combinational logic circuit 503*b*. The operation of the random number generator 500*a* is related to the random seed 51*a* received at the static state, the bit shift operation of the LFSR 501*a*, and the design of the combinational logic circuit 503*a*. The random number generator 500*b* generates the random bitstream P at the feedback terminal Nf2, and the random number generator 500*a* generates the output sequence Q at the feedback terminal Nf1.

In FIG. 9A, the random seeds 51*a*, 51*b* are received from different sources. The random seed 51*a* being transmitted to the random number generator 500*a* is originated from a bitmap table 551, and the random seed 51*b* being transmitted to the random number generator 500*b* is originated from another bitmap table 553. Both the bitmap table 551, 553 are with physical unclonable function (PUF).

Figure 9B:
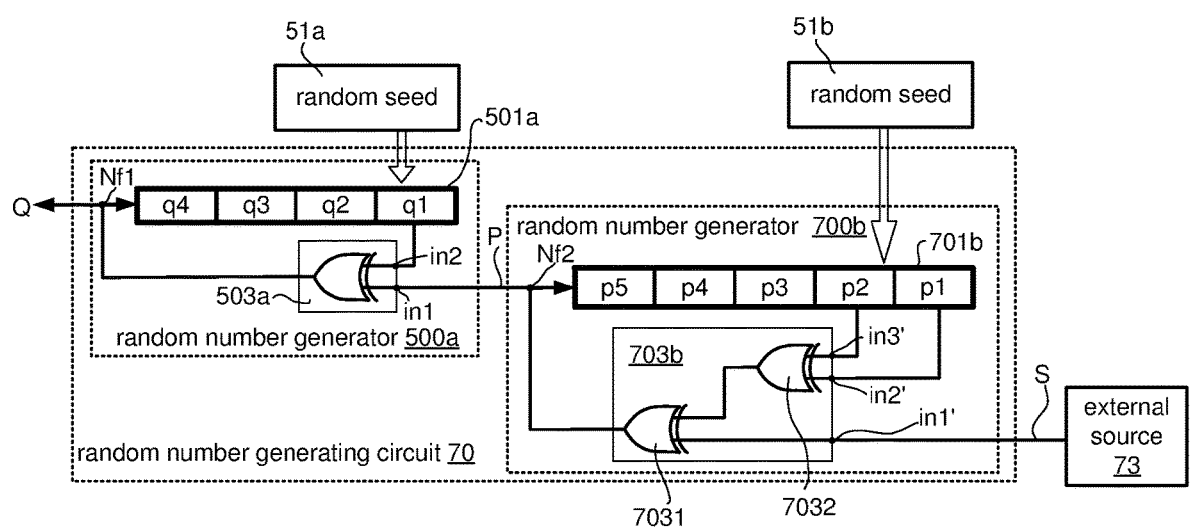
FIG. 9B is a schematic diagram illustrating that the random number generating circuit has two random number generators and receives a random bitstream from an external source.

FIG. 9B is a schematic diagram illustrating that the random number generating circuit has two random number generators and receives a random bitstream from an external source. The random number generating circuit 70 includes random number generators 500*a*, 700*b*. The random number generator 700*b* includes an LFSR 701*b* having five storage elements p1~p5, a combinational logic circuit 703*b*, and a feedback terminal Nf2. The combinational logic circuit 703*b* further includes logic gates 7031, 7032. The random number generator 500*a* has been illustrated in FIG. 9A.

In the static state, the random number generator 700*b* receives the random seed 51*b*, and the random number generator 500*a* receives the random seed 51*a*. Both the LFSRs 501*a*, 701*b* repetitively perform bit shift operation while receiving clock cycles of the clock signal ck.

In FIG. 9B, the first-stage random number generator (that is, random number generator 700*b*) has a two-stack structure. The two-stack structure of the combinational logic circuit 703*b* is similar to that of the combinational logic circuit 603' in FIG. 6B. That is, instead of receiving the random bitstream with the logic gate 7032 at the first stack, the random bitstream S is received by the logic gate 7031 at the second stack from the external source 73.

The logic gate 7032 receives data stored at the storage elements p2, p1 through input terminals in2, in3. Then, the logic gates 7032, 7031 perform the logic operations to generate an output (that is, random bitstream P) at the feedback terminal Nf2. As the operations of the random number generator 500*a* are similar to the ones shown in FIG. 7, descriptions related to the random number generator 500*a* in FIG. 9B are omitted.

Figure 10:
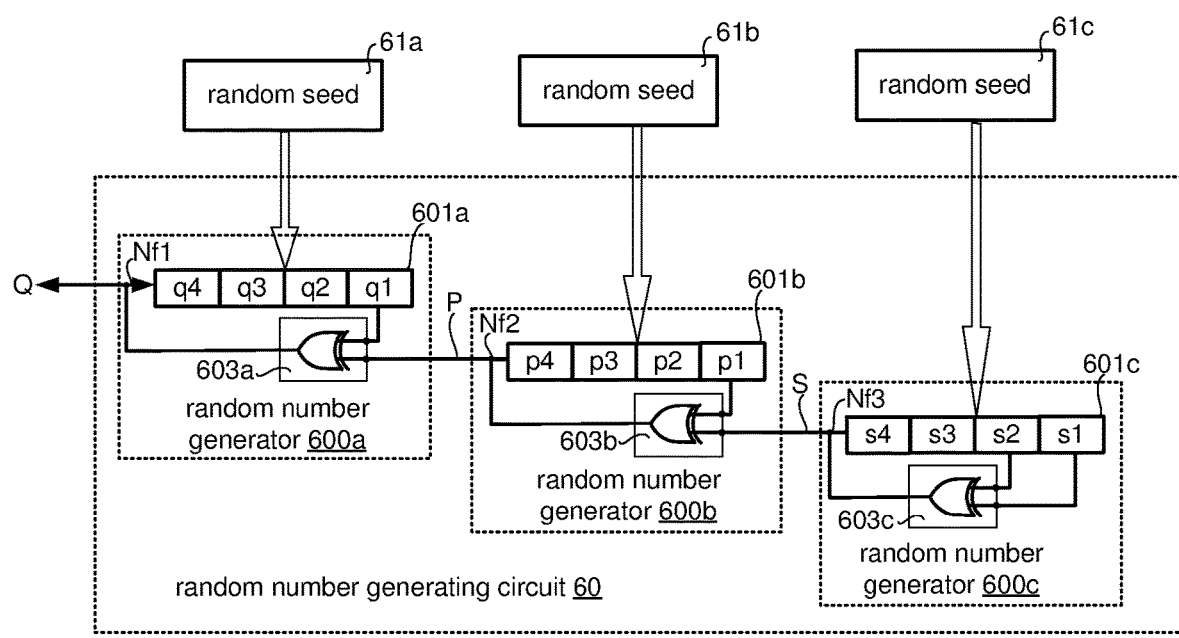
FIG. 10 is a schematic diagram illustrating a random number generating circuit having three stages of random number generator.

FIG. 10 is a schematic diagram illustrating a random number generating circuit having three stages of random number generator. The random number generating circuit 60 includes random number generators 600*a*, 600*b*, 600*c*, which are coupled in serial. In practical application, more random number generators can be used and coupled similarly.

Generation of the output sequence (Q) in FIG. 10 includes three stages, an initial stage performed by the random number generator 600c, a middle stage performed by the random number generator 600b, and a final stage performed by the random number generator 600a.

The random number generator 600c includes LFSR 601c having storage elements s1, s2, s3, s4, a combinational logic circuit 603c, and a feedback terminal Nf3. The storage elements s1, s2, s3, s4 jointly receives a random seed 61c in the static state. When the LFSR 601c receives the clock signal clk, the storage elements s1, 2, s3, s4 perform the bit shift operation in each clock cycle. Therefore, the data stored at the LFSR 601c continually change in response to the clock cycles. The combinational logic circuit 603c generates a random bitstream S at the feedback terminal Nf3. The random bitstream S is further transmitted to the random number generator 600b and the storage element s4.

The operations of the random number generators 600c, 600b are similar. The random number generator 600b includes an LFSR 601b having storage elements p1, p2, p3, p4, a combinational logic circuit 603b, and a feedback terminal Nf2. The storage elements p1~p4 of the LFSR 601b jointly receive a random seed 61b. The combinational logic circuit 603b performs another logic operation based on the random bitstream S and datum stored at the storage element p1. The combinational logic circuit 603b outputs a random bitstream P at the feedback terminal Nf2, and the random bitstream P is further utilized by the random number generator 600a and transmitted to the storage element p4.

The random number generator 600a includes an LFSR 601a having storage elements q1~q4, a combinational logic circuit 603a, and a feedback terminal Nf1. The storage elements q1~q4 of the LFSR 601a jointly receive a random seed 61a. The combinational logic circuit 603a receives the random bitstream P and taps the datum stored at the storage element q1. The combinational logic circuit 603a generates the output sequence Q at the feedback terminal Nf1 after performing the logical operation to the random bitstream P and the datum stored at the storage element q1. The output sequence Q is further transmitted to and stored at the storage element q4.

As illustrated above, both the random number generators 600b, 600c are utilized for generating temporarily used random bitstreams P, S. As the temporarily used random bitstreams P, S are dynamically generated in a real-time manner, they are invisible from the exterior of the random number generating circuit 60. Therefore, the random bitstreams P, S cannot be monitored like the output sequence Q nor being reversed like the hardware components (the logic gates in the combinational logic circuit). Consequentially, the security of the random number generating circuit can be dramatically improved because the randomness of the output sequence Q is further increased due to the use of the random number generators 600b, 600c.

In FIG. 10, the combinational logic circuits 603a, 603b, 603c are assumed to be XOR circuits, and the LFSR 601a, 601b, 601c are assumed to include four storage elements. However, the implementations of the combinational logic circuits 603a, 603b, 603c, and the LFSR 601a, 601b, 601c may vary in practical applications. For example, the number of the storage elements in the LFSR 601a, 601b, 601c might not be the same, and the combinational logic circuits 603a, 603b, 603c may include more than one logic gates.

Figure 11A:
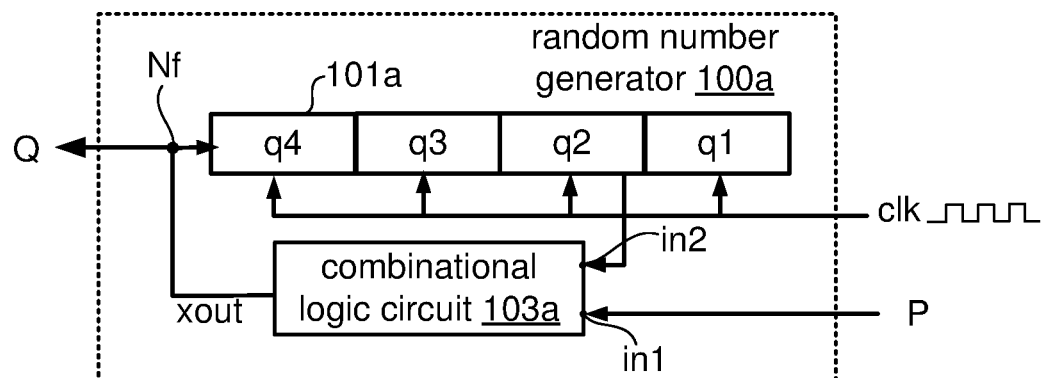
FIGS. 11A and 11B are schematic diagrams showing that the connections between input terminals of the combinational logic circuit and the storage elements in the shift register can be freely designed.
Figure 11B:
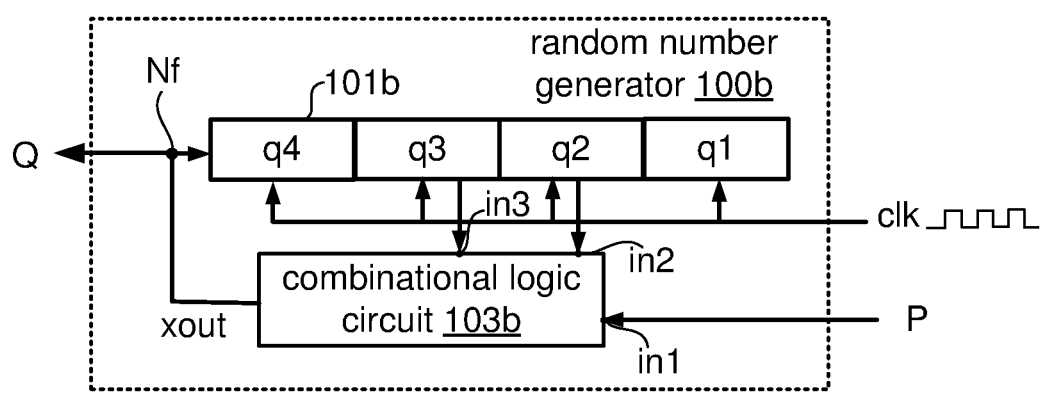

For the sake of illustration, in the above embodiments, one of the input terminals of the combinational logic circuit is electrically connected to the storage element corresponding to the last bit (that is, the storage element q1). Whereas, in practical application, the input terminal can be arbitrarily electrically connected to any of the storage elements. FIGS. 11A and 11B are schematic diagrams showing that the connections between input terminals of the combinational logic circuit and the storage elements in the LFSR can be freely designed.

In FIG. 11A, the random number generator 100a includes the LFSR 101a, the combinational logic circuit 103a, and the feedback terminal Nf. The LFSR 101a includes storage elements q1~q4, and the combinational logic circuit 103a includes input terminals in1, in2. The input terminal in1 is assumed to receive the random bitstream P, and the design of the combinational logic circuit 103a is not repetitively illustrated. The input terminal in2 is assumed to be electrically connected to the storage element q2. Thus, the logic operation performed by the combinational logic circuit 103a is based on the random bitstream P, and the datum tapped from the storage element q2. Details of the logic operation of the combinational logic circuit 103a are omitted to avoid redundancy.

In FIG. 11B, the random number generator 100b includes the LFSR 101b, the combinational logic circuit 103b, and the feedback terminal Nf. The LFSR 101b includes storage elements q1~q4, and the combinational logic circuit 103b includes input terminals in1, in2, in3. The design of the combinational logic circuit 103b is not repetitively illustrated. The input terminals in2, in3, are assumed to be electrically connected to the storage elements q2, q3, respectively. Thus, the logic operation performed by the combinational logic circuit 103b is based on the data tapped from the storage elements q2, q3, and the random bitstream P. Details of the design and logic operation of the combinational logic circuit 103b are omitted to avoid redundancy.

According to FIGS. 11A and 11B, the connections between the input terminals of the combinational logic circuit, the storage elements, and the feedback terminal Nf can be freely determined.

Random number generator (RNG) is an important feature in modem circuit design as it can be used in different fields such as data encryption in 5G network, one-time password, lottery, statistical simulation, and so forth. Various embodiments of the random number generator and the random number generating circuit are illustrated. As the above-mentioned embodiments utilize hardware implementation, their implementations need only a small area and capable of providing randomness at high speed.

The random seed(s) being adopted in the embodiments has a high degree of entropy, and the use of the random bitstream further enhance the randomness degree. In a case that the XOR gate or the exclusive-nor (XNOR) is/are adopted as the logic gate(s) in the combinational logic circuit, the output sequence Q has a uniform statistical distribution of 0's and 1's. According to the disclosure, even if an attacker is capable of monitoring the output sequence (Q) and finds out the circuit design of the combinational logic circuit by reversed engineering, the pattern of the output sequence (Q) is still unpredictable because of the use of the random bitstream (P).

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A random number generator operating based on a plurality of clock cycles, comprising:
   a shift register, configured to repetitively perform a bit shift operation in the plurality of clock cycles, comprising:
   N storage elements, electrically connected in series and configured to respectively receive N bits of a random seed in a static state, comprising:
   a first storage element;
   a second storage element; and
   a third storage element;
   a combinational logic circuit, comprising:
   a first input terminal, electrically connected to an external source, from which a random bitstream is able to be continually received in the plurality of clock cycles;
   a second input terminal, electrically connected to the first storage element, configured for tapping datum stored at the first storage element; and
   at least one logic gate, configured for performing at least one logic operation based on the random bitstream and the datum tapped by the second input terminal, comprising:
   a first logic gate, comprising:
   a first logic input and a second logic input, respectively directly electrically connected to the first input terminal and the second input terminal; and
   a second logic gate, comprising:
   a third logic input and a fourth logic input, wherein the third logic input is electrically connected to the third storage element and configured for tapping datum stored at the third storage element, and the fourth logic input is configured for receiving an output of the first logic gate,
   wherein the second logic gate performs a second logic operation to the datum tapped by the third logic input and the output of the first logic gate, and the second logic gate is configured to generate an output sequence in the plurality of clock cycles; and
   a feedback terminal, electrically connected to the second storage element and the second logic gate, configured for outputting the output sequence, wherein datum stored at the second storage element is configured to be repetitively updated with the output sequence in the plurality of clock cycles, wherein N is an integer greater than 1.

2. The random number generator according to claim 1, wherein the feedback terminal is directly electrically connected to an output of the second logic gate.

3. The random number generator according to claim 1, wherein the first logic gate is an exclusive-or (XOR) gate or an exclusive-nor (XNOR) gate.

4. The random number generator according to claim 1, wherein
   the random seed is originated from one of a bitmap table with physical unclonable function (P.U.F.), a random telegraph noise (RTN) source, an unstable electronic oscillator, a real-time clock (R.T.C.), a software-based seed, and an algorithm-based seed.

5. The random number generator according to claim 1, wherein
   the external source is an unstable flip-flop, a random telegraph noise (RTN) device, a real-time clock (R.T.C.), an unstable electronic oscillator, or another random number generator.

6. The random number generator according to claim 1, wherein
   the second storage element is corresponding to an N-th bit among the N bits, and
   the first storage element is corresponding to one of the N bits other than the N-th bit.

7. The random number generator according to claim 1, wherein
   the shift register is configured to receive the random seed upon power-on or reset of the random number generator; and
   the shift register is configured to stop receiving the random seed while performing the bit shift operation.

8. A random number generator operating based on a plurality of clock cycles, comprising:
   a shift register, configured to repetitively perform a bit shift operation in the plurality of clock cycles, comprising:
   N storage elements, electrically connected in series and configured to respectively receive N bits of a random seed in a static state, comprising:
   a first storage element;
   a second storage element; and
   a third storage element;
   a combinational logic circuit, comprising:
   a first input terminal, electrically connected to an external source, from which a random bitstream is able to be continually received in the plurality of clock cycles;
   a second input terminal, electrically connected to the first storage element, configured for tapping datum stored at the first storage element; and
   at least one logic gate, configured for performing at least one logic operation based on the random bitstream and the datum tapped by the second input terminal, comprising:
   a first logic gate, comprising:
   a first logic input, directly electrically connected to the second input terminal; and
   a second logic input, electrically connected to the third storage element, configured for tapping datum stored at the third storage element, wherein the first logic gate is configured to perform a first logic operation to the datum tapped by the second input terminal and the second logic input; and
   a second logic gate, comprising:
   a third logic input, electrically connected to the first logic gate, configured for receiving an output of the first logic gate; and
   a fourth logic input, configured for receiving the random bitstream, wherein the second logic gate is configured to perform a second logic operation to the output of the first logic gate and the random bitstream; and
   a feedback terminal, electrically connected to the second storage element, configured for outputting an output sequence in the plurality of clock cycles in response to the at least one logic operation, wherein datum stored at the second storage element is configured to be repetitively updated with the output sequence in the plurality of clock cycles, wherein N is an integer greater than 1.

9. The random number generator according to claim 8, wherein the feedback terminal is directly electrically connected to an output of the second logic gate.

10. A random number generating circuit, comprising:
a first random number generator, comprising:
a first shift register, comprising:
N first storage elements, electrically connected in series, comprising:
a first storage element of the first shift register; and
a second storage element of the first shift register, wherein the N first storage elements are configured to respectively receive N bits of a first random seed in a static state, and the first shift register is configured to repetitively perform a first bit shift operation in a plurality of clock cycles;
a first combinational logic circuit, comprising:
a first input terminal of the first combinational logic circuit, configured for receiving a first random bitstream from a first external source in the plurality of clock cycles;
a second input terminal of the first combinational logic circuit, electrically connected to the first storage element of the first shift register, configured for tapping datum stored at the first storage element of the first shift register; and
at least one first logic gate, configured for performing at least one first logic operation based on the first random bitstream and the datum tapped by the second input terminal of the first combinational logic circuit; and
a first feedback terminal, electrically connected to the second storage element of the first shift register, configured for outputting an output sequence in the plurality of clock cycles in response to the at least one first logic operation, wherein datum stored at the second storage element of the first shift register is configured to be updated with the output sequence in the plurality of clock cycles; and
a second random number generator, configured for being the first external source, comprising:
a second shift register, comprising:
M second storage elements, electrically connected in series, comprising:
a first storage element of the second shift register;
a second storage element of the second shift register; and
a third storage element of the second shift register, wherein the M second storage elements respectively receive M bits of a second random seed in the static state, and the second shift register repetitively performs a second bit shift operation in the plurality of clock cycles;
a second combinational logic circuit, comprising:
a first input terminal of the second combinational logic circuit, electrically connected to the first storage element of the second shift register, configured for tapping datum stored at the first storage element of the second shift register;
a second input terminal of the second combinational logic circuit, electrically connected to the second storage element of the second shift register, configured for tapping datum stored at the second storage element of the second shift register; and
at least one second logic gate, configured for performing at least one second logic operation based on the datum tapped by the first input terminal of the second combinational logic circuit and the datum tapped by the second input terminal of the second combinational logic circuit; and
a second feedback terminal, electrically connected to the first random number generator, an output of the second combinational logic circuit, and the third storage element of the second shift register, configured for outputting the first random bitstream, wherein datum stored at the third storage element of the second shift register is repetitively updated with the first random bitstream in the plurality of clock cycles, wherein M and N are integers greater than 1.

11. The random number generating circuit according to claim 10, wherein the at least one second logic gate comprises:
a first logic gate of the at least one second logic gate, configured for performing the at least one second logic operation of the at least one second logic gate to the datum tapped by the first input terminal of the second combinational logic circuit and the datum tapped by the second input terminal of the second combinational logic circuit.

12. The random number generating circuit according to claim 11, wherein the second feedback terminal is electrically connected to an output of the first logic gate of the at least one second logic gate.

13. The random number generating circuit according to claim 11, wherein the at least one second logic gate further comprises:
a second logic gate of the at least one second logic gate, electrically connected to a second external source, from which the second random bitstream is continually received in the plurality of clock cycles, wherein the second logic gate of the at least one second logic gate performs another logic operation of the at least one second logic gate based on the second random bitstream and an output of the first logic gate of the at least one second logic gate.

14. The random number generating circuit according to claim 13, wherein
the second external source is an unstable flip-flop, a random telegraph noise (RTN) device, a real-time clock (R.T.C.), an unstable electronic oscillator, or a third random number generator.

15. The random number generating circuit according to claim 10, wherein the first shift register and the second shift register are linear feedback shift registers, and the N first storage elements and the M second storage elements are delay flip-flops.

16. The random number generating circuit according to claim 10, wherein
the second storage element of the first shift register is corresponding to an N-th bit among the N bits;
the first storage element of the first shift register is corresponding to one of the N bits other than the N-th bit;
the third storage element of the second shift register is corresponding to an M-th bit among the M bits; and
the first storage element of the second shift register and the second element of the second shift register are corresponding to two of the M bits other than the M-th bit.

* * * * *